Aug. 21, 1951  M. LEBOVITZ  2,565,245
METHOD AND MEANS FOR SHAPING MEATS
Filed Nov. 12, 1949  3 Sheets-Sheet 1

Inventor
*Morris Lebovitz*

By
*William J. Ruano*
Attorney

Aug. 21, 1951  M. LEBOVITZ  2,565,245
METHOD AND MEANS FOR SHAPING MEATS
Filed Nov. 12, 1949  3 Sheets-Sheet 2
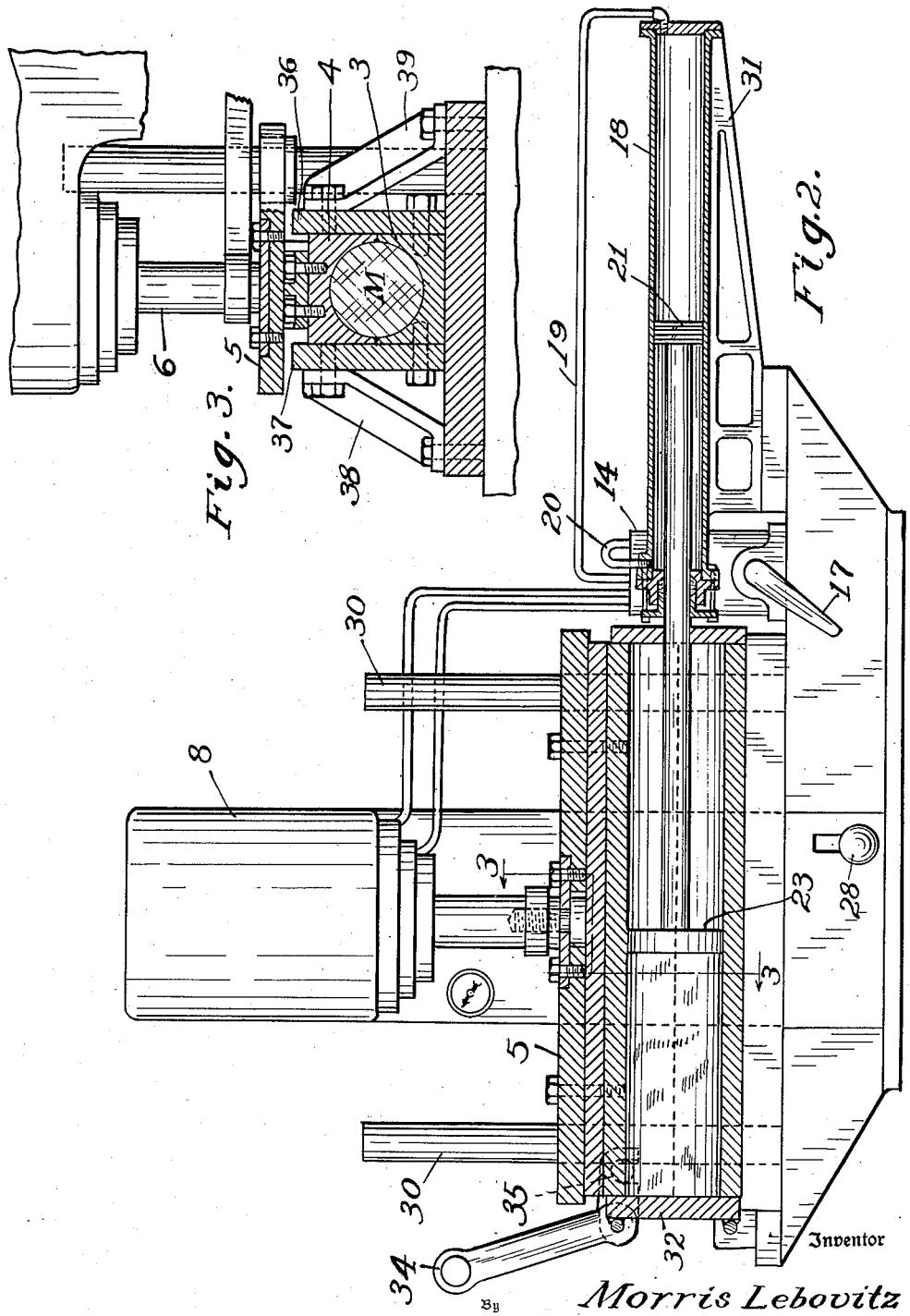
Inventor
Morris Lebovitz
By William J. Ruano
Attorney Aug. 21, 1951 — M. LEBOVITZ — 2,565,245
METHOD AND MEANS FOR SHAPING MEATS
Filed Nov. 12, 1949 — 3 Sheets-Sheet 3

Inventor
Morris Lebovitz
By William J. Ruano
Attorney

Patented Aug. 21, 1951

2,565,245

UNITED STATES PATENT OFFICE 2,565,245

METHOD AND MEANS FOR SHAPING MEATS

Morris Lebovitz, Pittsburgh, Pa., assignor to Churchill Meat Company, Pittsburgh, Pa., a corporation of Pennsylvania Application November 12, 1949, Serial No. 126,907

2 Claims. (Cl. 100—57)

This invention relates to a method and apparatus for shaping meats, particularly fresh meat in solid form, for the purpose of providing uniform cross-section thereto so that upon slicing, the pieces will be of the same size, for example, uniformly sized discs. Such pieces are especially useful for making steak sandwiches.

A common method of shaping an irregular piece of fresh meat, such as a solid piece of beef, is to first thaw it out from its initial semifrozen condition in which it is shipped to enable deformation into the desired shape. The piece is then trimmed down to the right length and cross-section so that it may be fitted into a two-part mold having the desired shape. The mold cover is now tightly clamped to deform the meat to the shape of the mold and the mold is stored in a freezer until the meat is frozen. The mold must then be thawed out to enable separation of the adhering frozen meat therefrom which will thaw out the outer surface portion of the meat. The piece is then sliced and refrozen. This method has many outstanding objections. In the first place, as the result of initial thawing to enable deformation of the meat, a substantial amount of blood will run out and become lost, which constitutes a great waste and causes the meat to become dry, fibrous and lose most of its taste. In the trimming process whereby the piece must be reduced in length and cross-section to approximately the shape of the mold so as to fit therein there results a great amount of waste since the pieces trimmed off are unusable except for grinding. Moreover, a large number of individual molds must be used in order to shape an appreciable number of pieces of meat. Additionally, great manual effort is required to clamp the mold covers sufficiently tightly so as to compress the meat into the shape of the mold, therefore making the clamping operation of the molds a very laborious and time consuming undertaking. The thawing operation and removal of the pieces from the mold likewise are time consuming—moreover, the above-described alternate thawing and freezing operations expose the meat to bacteria and cause the meat to discolor and look spoiled, thereby requiring further trimming and resulting in more waste. Thus, in view of the large number of operations required, the excessive waste, and the loss of flavor of the resulting product, this method is far from satisfactory.

An object of the present invention is to overcome the above-named disadvantages of the described common method of shaping meat and to provide a novel method and apparatus for shaping fresh pieces of solid meat into a uniform configuration, such as a cylindrical configuration, so that slices thereof are of uniform size.

A more specific object of the present invention is to provide a novel method for shaping meat into cylindrical form or other desired shape, which method eliminates loss of blood as well as flavor and discoloration normally accompanying commonly used meat shaping operations, also which is speedier than presently known methods, and which provides a uniformly shaped solid piece of meat retaining all the blood content and flavor as well as the original appearance of fresh meat.

A further object of the present invention is to provide a hydraulic press having a novel die construction and meat compressing means to provide uniform shaping of substantially frozen meat.

Other objects and advantages of the present invention will become apparent from a study of the following specification, taken with the accompanying drawings wherein:

Fig. 2 is a front elevational view of the hydraulic press with the hydraulic cylinder and die parts shown in longitudinal cross-section so as to more clearly illustrate the salient features of the invention;

Fig. 3 is a transverse cross-section of the die parts taken along line 3—3 of Fig. 2;

Figure 4:
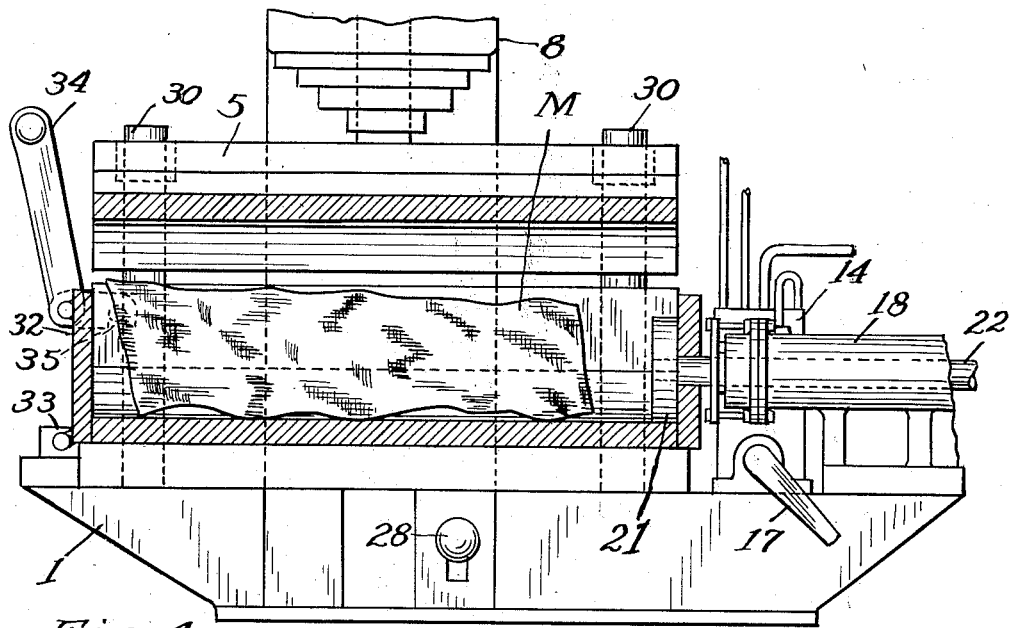
Figure 5:
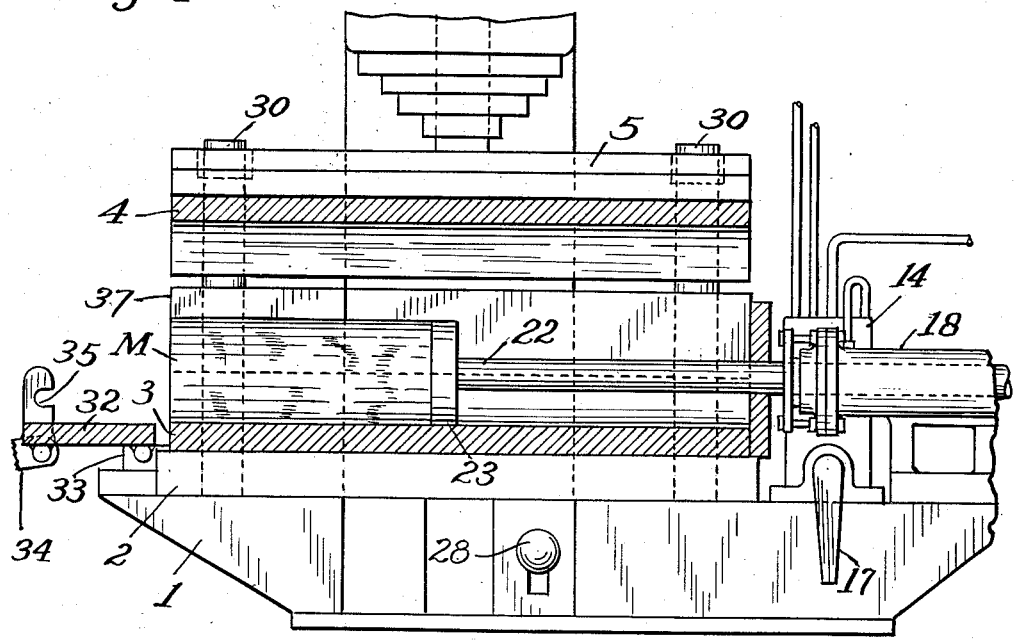

Fig. 4 is a longitudinal cross-section similar to Fig. 2, except that it shows the top or movable die in an elevated position, to allow introduction of an irregular shaped piece of meat between the dies, and Fig. 5 is a longitudinal sectional view similar to Fig. 4, except that it shows the die parts in their open position after the meat has been compressed into cylindrical form and the end cover in the open or unclamped position to enable removal of the compressed meat.

Figure 1:
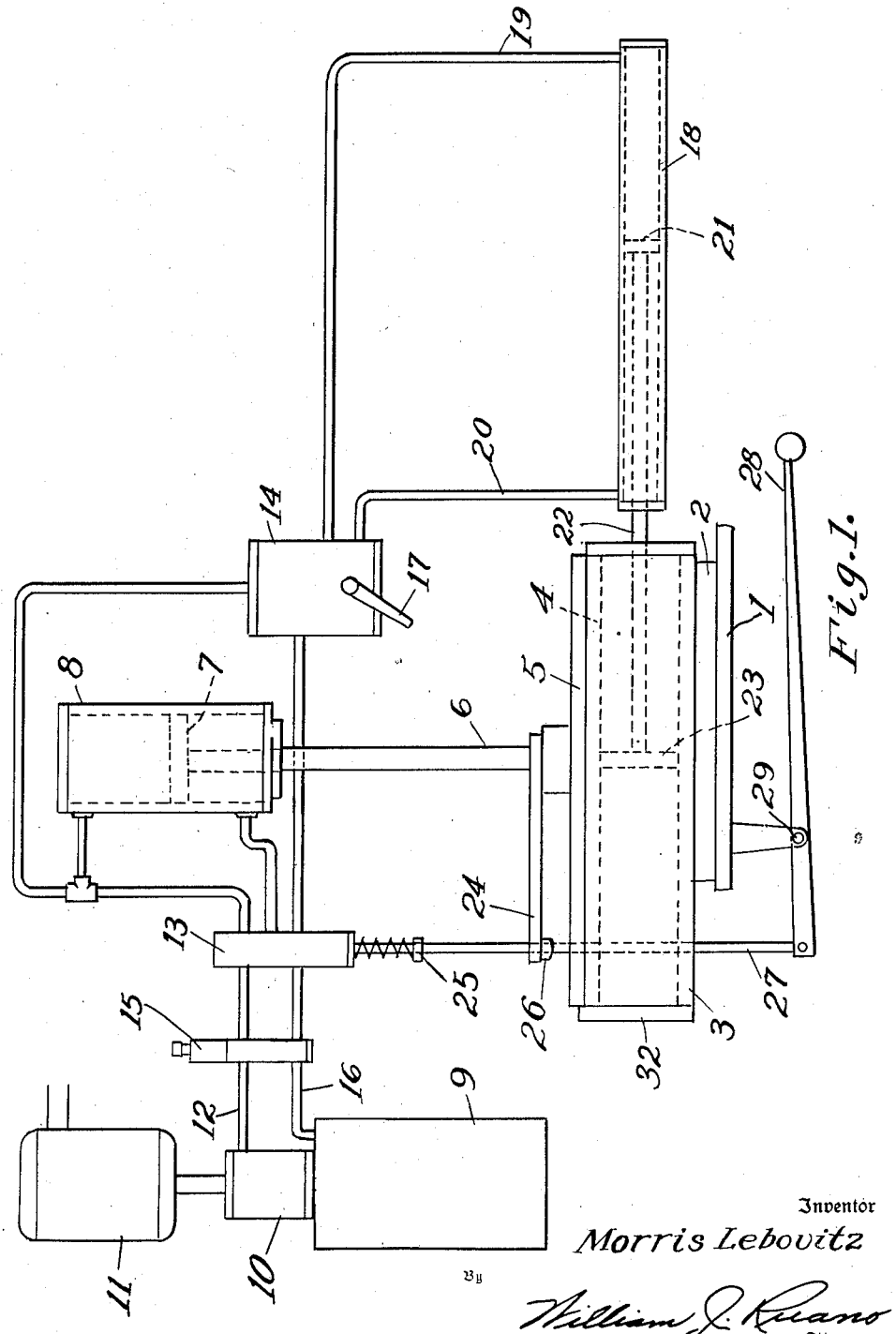
Fig. 1 is a schematic diagram of a complete hydraulic press or system for carrying out the present process, and for operating the novel dies and compressing or ramming means involving the present invention.

Referring more particularly to Fig. 1, numeral 1 denotes a hydraulic press table having supported thereon a bottom die shoe 2, which in turn supports a bottom die 3 of substantially semicylindrical shape. Cooperating therewith is a top die 4 also of semicylindrical shape so that together with die 3 there will be formed a hollow cylindrical mold. A top die shoe 5 supports die 4 and is moved upwardly and downwardly by means of a press ram 6 whose top end is connected to a piston 7 reciprocable within a hydraulic cylinder 8.

The source of hydraulic fluid, such as oil, comprises a storage tank 9 filled with oil and enclosing a hydraulic pump 10 which is driven by a suitable electric motor 11. The hydraulic pump 10 creates pressure in a pressure line 12 which is connected to the top end of the cylinder 8 as well as to two four-way valves represented by numerals 13 and 14. A pressure relief valve 15 is provided to avoid building up of excessive or unsafe pressures. A return line 16 is provided for returning hydraulic fluid to the tank 9. The four-way valve 14 is operated by a handle 17. Oil or hydraulic fluid may be introduced, when desired, in either end of cylinder 8 and may be selectively introduced either into the right or left end of hydraulic cylinder 18 through pipes 19 or 20, respectively. In other words, by introducing hydraulic fluid either into the right end or left end of piston 21, the piston rod 22 may be selectively moved longitudinally in either direction so as to reciprocate the ram or plunger 23.

Attached to the press ram 6 is a ram guide 24 which is cooperable with stop collars 25 and 26 rigidly fixed to a vertically extending operating rod 27. By rocking movement of an operating lever 28 about a pivot 29, rod 27 may be either lifted or lowered to operate the four-way valve element 13.

In operation, when lever 28 is lifted so as to operate the four-way valve element 13, a fluid connection is established through cylinder 8 so as to effect raising of press ram 6 and the top die 4. A piece of fresh meat is then introduced in the space between the top and bottom dies and lever 28 is moved downwardly so as to effect a connection through valve part 13 so as to introduce hydraulic liquid above piston 7 and cause a downward movement thereof. Then lever 17 is operated in a manner so as to introduce hydraulic liquid alternately on the right and left hand sides of piston 21 to provide a ramming effect to the meat enclosed within the dies.

Much of the above described hydraulic system is well known and is referred to merely to illustrate a complete hydraulic system, it being noted that other well known hydraulic systems for obtaining the desired movements of the top die and ramming piston are equally suitable. The salient features of the invention will now be described.

Referring more particularly to Figs. 2 to 5, inclusive, which show the specific details of construction of the dies of the hydraulic press, it will be noted that the hydraulic press table has supported thereon a bottom die shoe 2 on which is supported a stationary or bottom die 3 having an inner surface of semicylindrical configuration with one end thereof open. The top die 4 also has an inner semicylindrical surface forming the other half of a hollow cylindrical die or mold for shaping the meat. As will appear more clearly in Fig. 3, the outer surfaces of the dies form a rectangular block. Die 4 is supported by the top die shoe 5 which in turn is rigidly connected to a press ram 6. At the top end of press ram 6 is a piston which is reciprocable within the hydraulic cylinder 8 so that the operator, by controlling the operating lever 28, may selectively lower or lift the top die shoe to the positions shown in Figs. 3 and 4, respectively. The vertical movement of the top die shoe is guided by guide pins or posts 30. The hydraulic cylinder 18 is supported on the press table by an intermediary mounting bracket 31.

As will appear more clearly in Figs. 4 and 5, the left end of the die as viewed in these figures is open and an end cover 32 pivotally mounted on the bottom die at 33. A latch 34 is pivotally mounted on the end cover so that upon turning of the latch about its pivot, its latching or hook portion 35 may be latched to the bottom die so as to securely lock the end cover in a vertical position.

An important feature of the invention resides in the process of treating and shaping the meat so as to provide a uniform cross-section, for example, in the shape of a solid cylinder in order to facilitate slicing thereof into pieces of not only uniform thickness but of uniform cross-section or diameter to make the pieces disc shaped and suitable for sandwiches.

The meat is initially brought to a temperature of between 28° and 32° F. I have found through experimentation that this is the optimum range of temperature for the meat when it is introduced into a hydraulic press. Within this temperature the meat has the amazing characteristic of being deformable, provided suitable hydraulic pressure is applied thereto, and retaining the deformed shape. I am aware that the temperature may be lowered to as much as 20° F. and still obtain somewhat satisfactory results, however fat portions tend to crumble, and better results are attained with the meat at a temperature of about 30° F., that is, just below or substantially at the freezing point. The piece of fresh meat M which may be a solid piece of beef, for example, is initially of irregular shape, such as shown in Fig. 4. It has a smaller cross-section than that of the dies and is introduced into the bottom die. The end cover 32 is latched closed, as shown, and thereafter the operating lever 28 is operated so as to cause the hydraulic cylinder 8 to force the press ram downwardly and with it the top die 5. As will appear more clearly in Fig. 2, the top die 5 will move until its bottom longitudinal edges come into abutment with the top longitudinal edges of the bottom die 3. Vertically extending side plates 36 and 37 supported by angular support brackets 38 and 39 prevent escape of the meat when under compression. Then the handle 17 is operated so as to introduce hydraulic fluid into the right hand portion of hydraulic cylinder 18 and thereby force the plunger 23 therein to the left so as to compress the meat into the shape defined by the dies, that is, into a solid cylinder piece as shown in Fig. 5. It will be noted from a comparison of Figs. 4 and 5 that the length of the meat is appreciably reduced, whereas its diameter is somewhat enlarged to conform to that of the dies. Most satisfactory results are obtained when the plunger 23 is reciprocated several times, under pressures of the order of about 1 to 2 tons, to provide a ramming effect against the end of the meat, since in so doing the meat is permitted to alternately expand slightly and then become compressed so as to fill all possible void spaces that may exist and thereby produce a uniformly solid piece of meat. Piston 23 may have a diameter of the order of 4 inches.

After the meat has been compressed, the end cover 32 is unlatched from the bottom die to allow it to drop from the position shown in Fig. 4 to that shown in Fig. 5. Operating handle 28 is operated to control the hydraulic fluid in cylinder 8 in a manner so as to lift the top die to the position shown in Fig. 5. The meat is then pushed to the left end of the die by means of the plunger 23 as shown in this figure and may be pushed completely out of the dies by allowing the plunger 23 to move to the limit of its stroke. Instead, however, the operator may insert his hand and grasp the meat from the position shown in Fig. 5 and remove it from the mold. The meat is then brought to a slicing machine and sliced to the desired thickness. Thereafter, it may be introduced through tenderizing knives or other tenderizing process and finally wrapped and inserted in a cold storage compartment and brought to below freezing temperatures, that is, temperatures of the order of 0° F. Thus there is eliminated any necessity of thawing the meat at any time from the moment it is received from the shipper to the moment it is stored, therefore considerably shortening the time period for shaping the meat.

The above described process is suitable for shaping all kinds of solid or substantially solid meat. In instances where the meat is of greater diameter than the die, the top die may first be moved into position against the bottom die so as to compress it and cause lengthening thereof and thereafter the end cover 32 and ramming of plunger 23 will reduce the length of the meat. Or perhaps simultaneously the top die may be lowered while the ramming plunger is reciprocated to compress the meat into solid cylinder form.

Thus it will be seen that I have provided a novel process for shaping solid fresh meat which involves no loss of blood or flavor and eliminates discoloration such as is prevalent in presently employed methods of shaping meat, also, I have provided a novel hydraulic press, particularly a novel die construction which enables compression of the meat so as to have uniform cross-section, such as a solid cylindrical form of uniform density with practically no voids so as to make it especially useful for sandwich making. While the dies have been described as forming a hollow cylinder, it will be apparent that they may have other shapes, such as rectangular, octagonal, or the like, so as to give uniform cross-sections which are other than circular.

While I have illustrated and described a certain specific embodiment of my invention, it will be understood that this is by way of illustration only, and that various changes and modifications may be made within the contemplation of my invention and within the scope of the following claims.

I claim:

1. In a hydraulic press for shaping fresh meat into cylindrical form, in combination, a bottom semicylindrical stationary die, a top semicylindrical movable die, guide means for vertically guiding said top die so that it may be raised from or lowered into engagement with said bottom die, hydraulic means to reciprocate said top die, a pivotally mounted end cover for said bottom die, a latching lever pivotally mounted on said cover and adapted to clamp said cover to said bottom die, a plunger reciprocable within said dies and conforming to the shape thereof, a hydraulic cylinder exteriorly of said dies and including a piston in coaxial relationship to said plunger, and means controlled independently of said hydraulic means for introducing hydraulic fluid alternately against opposite faces of said piston in said hydraulic cylinder so as to effect reciprocation of the plunger contained within said dies and ramming of a piece of fresh meat contained within said dies while said end cover and top die are in the closed position, thereby shortening the length of the piece of meat as well as deforming it into the cylindrical shape of said dies.

2. The method of treating and reshaping an irregular piece of solid fresh meat having voids therein so as to provide slices of uniform cross-sectional shape without appreciable voids, comprising bringing the meat to about 30° F., introducing it into a mold while at said temperature, applying high pressure along one dimension of said meat while confined within said mold and simultaneously applying a series of successive ramming strokes along a transverse direction relative to said one dimension and of the order of tons of pressure so as to completely fill the voids adjacent the inner wall surfaces of said mold and those within the meat, thereby simultaneously reducing the length of the meat along said transverse direction in proportion to the total volume of said voids, and removing the shaped meat from the mold.

MORRIS LEBOVITZ.

REFERENCES CITED

The following references are of record in the file of this patent:

UNITED STATES PATENTS

| Number | Name | Date |
| --- | --- | --- |
| 229,590 | Cutting | July 6, 1880 |
| 234,983 | Hoefjen | Nov. 30, 1880 |
| 1,888,466 | Bellinghausen et al. | Nov. 22, 1932 |
| 2,043,366 | Bech | June 9, 1936 |
| 2,119,716 | McKee | June 7, 1938 |
| 2,241,807 | Cotner | May 13, 1941 |
| 2,250,649 | Pierson | July 29, 1941 |
| 2,334,559 | Jordan | Nov. 16, 1943 |